G. F. ZAUN.
VEHICLE DRAFT TONGUE.
APPLICATION FILED MAR. 13, 1919.
1,361,512.
Patented Dec. 7, 1920.
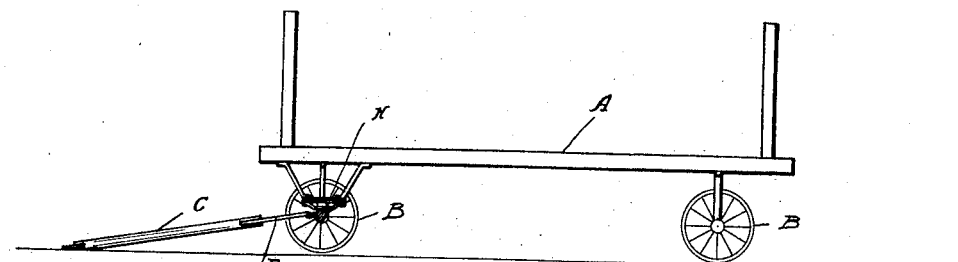
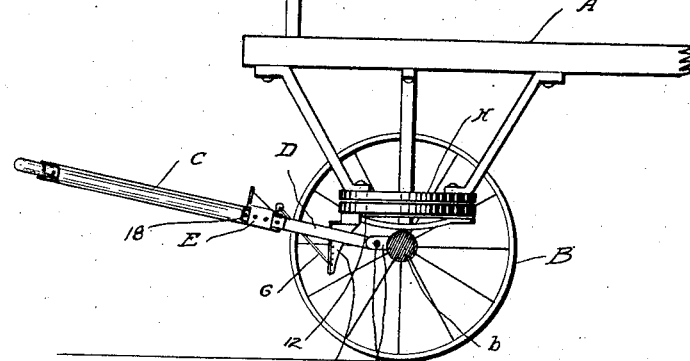
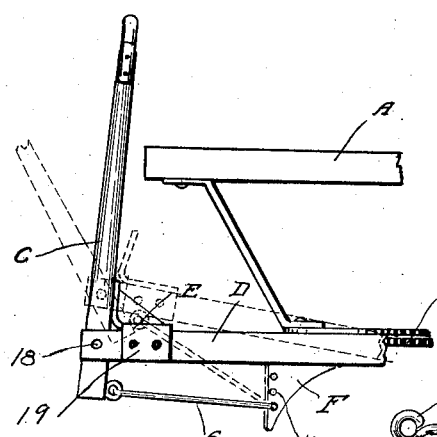
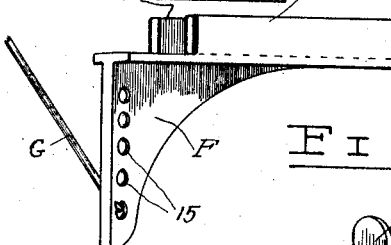
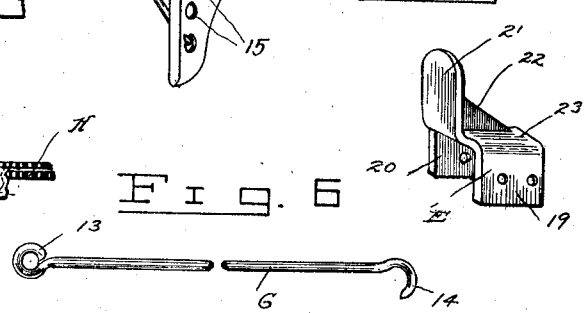
Inventor,
George F. Zaun.
By
His Attorney.

UNITED STATES PATENT OFFICE.

GEORGE F. ZAUN, OF SAN BERNARDINO, CALIFORNIA.

VEHICLE DRAFT-TONGUE.

1,361,512.   Specification of Letters Patent.   Patented Dec. 7, 1920.

Application filed March 13, 1919. Serial No. 282,274.

*To all whom it may concern:*

Be it known that I, GEORGE F. ZAUN, a citizen of the United States, residing at San Bernardino, in the county of San Bernardino and State of California, have invented new and useful Improvements in Vehicle Draft-Tongues, of which the following is a specification.

This invention relates to handle means for trucks or other vehicles, and has for its object to provide a new and efficient manner of placing the handle either in operative or neutral position.

In the embodiment of the invention about to be described, I have shown it in relation to a small express truck such as are commonly used at railway stations for the handling of baggage and for delivering the same to the baggage car of trains. As is well-known the handle or tongue by which the truck is drawn along, normally rests on the ground when not in use, or it may be held in an upward position by means of a strut or post. This often results in accidents, for if the tongue of a vehicle lies upon the ground persons walking to and from trains are liable to stumble over same with resulting injury, or if the tongue is not resting on the ground it being held up by some sustaining means, children are apt to knock said sustaining means from under the tongue, again resulting in possible injury. There is always danger at a railway station, especially where trains are passing one another or when trains are standing on a side track for loading passengers and another train coming into the station, that where the truck is drawn up beside the baggage car and the tongue is not placed rightly it may fall between the wheels of the moving train or the stationary train. This has occurred in many instances, often demolishing the truck and its contents completely or resulting in the derailing of the approaching train. The present invention obviates this difficulty by providing a positive means whereby the tongue may be held vertically to the futchell or may be placed in a normal position for drawing the truck from point to point. Also, when in a close position to other vehicles the tongue may be raised to an upright position at which point it will temporarily lock and the truck may be drawn along. It will be readily understood that by arranging the tongue so that it may draw the vehicle, whether the tongue is in a normal position or in a vertical position, space may be economized.

The invention has for further objects to provide an improved handle means of the character mentioned which will be generally superior in efficiency and serviceability, and which may be fitted at a minimum of time to any existing truck made, so that a new truck or a special form of truck is unnecessary. The device is at once simple in construction and reliable and convenient in use and action, as well as durable and sightly in appearance and may be readily installed in position for use.

With the above and other objects in view, the invention consists in the novel and useful provision, formation, construction, combination, association and inter-relation of parts, members and features, all as hereinafter described, shown in the drawing, and finally pointed out in claims.

In the drawing:

Figure 1 is a side elevation of the ordinary form of truck found at railway stations, and shows the usual form of tongue resting on the ground;

Fig. 2 is a fragmentary side elevation of the front end of the truck shown in Fig. 1, but embodying the improved handle means;

Fig. 3 is a side elevation of the handle and associated parts, the handle being shown by full lines in an upright position and by dotted lines in a partially lowered position.

Fig. 4 is a perspective of the perforated plate used in sustaining the tongue in position;

Fig. 5 is a perspective of the stop plate placed upon the futchell and normally holds the tongue in an upright position, and, Fig. 6 is a side elevation of the looped-end tie rod which connects between the perforated plate shown in Fig. 4 and an eye bolt connected to the rear end of the tongue.

Corresponding parts in all the figures are designated by the same reference characters.

Referring with particularity to the drawing, A designates the top carriage member of the truck; B designates the wheels; C designates the tongue, D the futchell, E the stop plate bracket attached to the futchell and holding the tongue when in an upright position; F designates the perforated plate or depending support and G designates the tie bar between the tongue and the perforated plate, and H the fifth wheel.

The top carriage A is supported in the usual manner and in the drawing is shown as supported at the rear by a back block and two wheels and at the front end by the end frame struts or bars, which bear directly over the points where the fifth wheel plates H are secured. This frame in turn is supported by the central bar $b$ and the wheels B. Attached to the fifth wheel H and on that portion of the fifth wheel which is connected with the central bar is the perforated plate or depending support F normally extending downwardly. In the drawing this perforated plate is shown in the form of an elongated T section provided with a curved portion in the plane of the normal axis of said T section for the purpose of acting as a brace to resist strains. The head of this T section is provided with flanges or perpendicular members 10 and 11 and running longitudinally thereof. The perforated sections of the plate F range downwardly on the normal axis of the T section, and the flanges or plates 10 and 11 are fastened upon a suitable block 12 and rigidly attached thereto by bolts or other means. These plates 10 and 11 prevent a turning movement in the plate F so that whenever the fifth wheel H is moved in response to the will of the operator, the plate F moves simultaneously also. The tie rod G is provided at one end with a loop 13 and at the other end with a hook 14. The hook end of the rod G normally connects with one of the perforations 15 in the plate F while the looped end 13 connects with the eye bolt in the rear end of the tongue C. In order that the radius of action of the tongue C may be varied according to the truck to which the apparatus is attached, the bar G is provided with the hook 14 which may be placed in any one of the perforations 15 of the plate F; that is, in any one of the holes or perforations that will allow the apparatus to work easily and properly.

The futchell D, as is customary in practice, is hinged by a pivotal means 16 to a small lug 17 attached to the wheel axis $b$. At the jaw portions of the futchell D the tongue C is pivotally connected by a pin 18 which extends through the tongue C and the jaw portions of the futchell D so that the tongue C may rotate on the same in a vertical plane between certain defined limits. The tongue C is so proportioned that the pin 18 passes through a predetermined point from the endmost portion so that a lever arm is provided which is longest from the pin 18 to the handle portion of the tongue C.

The stop portion E includes a clip formed with flanges 19 and 20 which straddle and are fastened on the jaws of the futchell member D at a point a short distance back from the pin 18. A stop 21 is provided on the member or stop portion E, said stop being braced by means 22 at its back portion for resisting compression stresses. This stop portion E is normally stamped out of one-piece of metal and the flanges 19 and 20 bent radially downwardly from a central portion 23, such central portion forming the base which fits upon the top of the futchell D and provides a support. The flanges 19 and 20 are tapped or have holes in the sides whereby bolts may be inserted to hold the member E rigidly to the jaws of the futchell D. What might be termed an extension of the bed plate 23 is bent upward and forms the stop portion 21, against which the tongue C rests when in an upright position. The brace 22 is connected to the stop member 21 and the bed plate 23. Upon examination it will be observed that the tie rod G moves upwardly and that the stop member E prevents the tongue C from continuing in its downward rotation because the under side of the plate 23 of the stop member E prevents such action. Upon moving the tongue to an upright position as illustrated in Fig. 3 the short lever arm of the tongue C, that is, the portion extending downwardly from the pin 18, moves through a small arc, which in turn causes the tie rod G to also move in an arc downwardly. This action first raises the futchell D upwardly (see dotted lines) and upon the tongue C reaching a perpendicular or upward position, the futchell D immediately drops to a lower level and the tie rod G assumes the position shown by solid lines in Fig. 3. It is this motion of the futchell moving upward and downward and the movement of the tie rod G as well as the short lever arm provided in the tongue C, that allows the truck to be drawn back and forth without pulling the tongue from its upright position. The only way in which said tongue may again be placed in a horizontal position is to elevate it slightly until the short radius arm of the tongue C is again able to rotate around the pin 18. It is this means which effectively prevents the tongue from being revolved, unless desired, out of position and provides at once a safety device.

It will be obvious that many changes and modifications may be made in practising the invention, in departure from the disclosure of the foregoing description and drawing, all without departing from the true spirit of the invention.

Having thus disclosed my invention, I claim and desire to secure by Letters Patent:

1. A vehicle provided with a tongue or the like whereby the vehicle may be drawn or handled, a futchell pivotally connected with the vehicle and with which the tongue is pivotally connected, stops connected with said futchell whereby the tongue may be maintained in different positions against movement in one direction, and a link pivotally connecting the vehicle and the tongue and coöperating with one of said stops to prevent pivotal movement of the tongue in either direction.

2. A vehicle provided with a tongue or the like whereby the vehicle may be drawn or handled, a futchell pivotally connected with the vehicle and with which the tongue is pivotally connected, stops connected with said futchell whereby the tongue may be maintained in different positions against movement in one direction, and a link pivotally connecting the vehicle and the tongue and coöperating with one of said stops to prevent pivotal movement of the tongue in either direction; said link and said tongue being capable of pivotal movement upon elevation of the futchell to release the tongue from the locked condition caused by the said co-action of the link and one of said stops.

3. A vehicle provided with a tongue or the like whereby the vehicle may be drawn or handled, a futchell pivotally connected with the vehicle and with which the tongue is pivotally connected, stops connected with said futchell whereby the tongue may be maintained in different positions against movement in one direction, and a link pivotally connecting the vehicle and the tongue and coöperating with one of said stops to prevent pivotal movement of the tongue in either direction; said link and said tongue being capable of pivotal movement upon elevation of the futchell to release the tongue from the locked condition caused by the said co-action of the link and one of said stops; there being a depending support connected with the vehicle and with which one end of said link is connected.

4. In a device of the character described, the combination with a vehicle running gear, of a futchell pivotally connected thereto, a draft tongue pivotally connected to the futchell, a relatively fixed bracket projecting from the running gear, and a link pivotally connecting the fixed bracket to the tongue and coöperating therewith to lock the tongue against swinging movement when the parts are in one position, the tongue being released from a locked position by swinging the futchell and parts carried thereby to break the locking relation between the handle and link.

5. In a device of the character described, the combination with a vehicle running gear, of a futchell pivotally connected thereto, a draft tongue pivotally connected to the futchell, a stop member applied to the futchell and limiting the swinging movement of the draft tongue in one direction, a relatively fixed bracket projecting from the running gear, and a link pivotally connecting the fixed bracket to the tongue and coöperating therewith to lock the tongue in engagement with the before-mentioned stop member, said locking relation between the parts being adapted to be broken by a swinging movement of the futchell and parts carried thereby.

6. In a device of the character described, the combination with a vehicle running gear, of a futchell pivotally connected thereto, a draft tongue pivotally connected to the futchell and provided at the pivot end thereof with an extension, a relatively fixed bracket projecting downwardly below the futchell, and a link pivotally connecting the fixed bracket to the extension of the draft tongue and coöperating therewith to lock the draft tongue in an upright position when it is swung upwardly, the said locking relation being adapted to be broken by swinging the futchell and parts carried thereby upwardly.

7. In a device of the character described, the combination with a vehicle running gear, of a futchell pivotally connected thereto, a draft tongue pivotally connected to the futchell and provided at its pivot end with an extension, a relatively fixed bracket projecting downwardly from the running gear at the rear end of the futchell, and a link member having one end thereof adjustably connected to the fixed bracket while the other end thereof is pivotally connected to the extension of the draft tongue and coöperates therewith to lock the draft tongue in an upright position, the said locking relation being broken when the futchell and parts carried thereby are swung upwardly.

8. In a device of the character described, the combination with a vehicle running gear, of a futchell pivotally connected thereto and comprising spaced side pieces, a draft tongue pivotally mounted between the forward ends of the spaced side pieces of the futchell and provided at its pivot end with an extension, a relatively fixed bracket projecting downwardly from the running gear, and extending between the spaced side pieces of the futchell at the rear end thereof, and a link pivotally connecting the fixed bracket to the extension of the tongue and coöperating therewith to lock the tongue in an upright position when it is swung upwardly, the said locking relation of the parts being adapted to be broken by swinging the futchell and parts carried thereby upwardly.

In testimony whereof, I have signed my name to this specification in the presence of two subscribing witnesses.

GEORGE F. ZAUN.

Witnesses:
B. F. McGLOTHLEN,
C. D. LINDSEY.